(12) United States Patent
Huang et al.

(10) Patent No.: US 10,379,644 B2
(45) Date of Patent: Aug. 13, 2019

(54) TOUCH SENSING MODULE

(71) Applicants: Interface Technology (ChengDu) Co., Ltd., Sichuan (CN); Interface Optoelectronics (ShenZhen) Co., Ltd., Shenzhen (CN); General Interface Solution Limited, Miaoli County (TW)

(72) Inventors: Yen-Heng Huang, Guangdong (CN); Po-Lin Chen, Guangdong (CN); Yue-Feng Yang, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Shenzhen (CN); GENERAL INTERFACE SOLUTION LIMITED, Miaoli County (TW)

( * ) Notice: Subject to any disclaimer, the term of this patent is extended or adjusted under 35 U.S.C. 154(b) by 18 days.

(21) Appl. No.: 15/484,128

(22) Filed: Apr. 10, 2017

(65) Prior Publication Data

US 2018/0143705 A1 May 24, 2018

(30) Foreign Application Priority Data

Nov. 18, 2016 (CN) .......................... 2016 1 1028749

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01)

(58) Field of Classification Search
CPC ...... G02F 1/1345; G02F 1/1333; G06F 3/041; G06F 3/044; G06F 3/0412
See application file for complete search history.

(56) References Cited

U.S. PATENT DOCUMENTS

2014/0160371 A1* 6/2014 Tokita ................... G02F 1/1309 349/12
2017/0363903 A1* 12/2017 Jung .................... G02F 1/13452
2017/0371447 A1* 12/2017 Fukushima ......... G02F 1/13338

* cited by examiner

*Primary Examiner* — Lunyi Lao
*Assistant Examiner* — Johny Lau
(74) *Attorney, Agent, or Firm* — CKC & Partners Co., LLC

(57) ABSTRACT

A touch sensing module includes a substrate, sensing electrodes, and a covering layer. The sensing electrodes are disposed on a surface of the substrate. Each of the sensing electrodes has a first end and a second end opposite to the first end. The second end is adopted to be electrically connected with an external circuit. The covering layer is disposed on a side of the sensing electrodes distal from the substrate, and covers the sensing electrodes. The covering layer has openings. The first ends of the sensing electrodes are exposed within the openings respectively.

7 Claims, 6 Drawing Sheets

TOUCH SENSING MODULE

RELATED APPLICATIONS

This application claims priority to Chinese Application Serial Number 201611028749.2, filed Nov. 18, 2016, which is herein incorporated by reference.

BACKGROUND

Field of Invention

The present disclosure relates to a touch sensing module.

Description of Related Art

A conventional touch sensing module, for example, a touch sensing module embedded inside a touch display apparatus, such as smart phone or smart panel, usually installs a protecting layer on a surface of the touch sensing layer faced outward, to avoid the touch sensing layer being directly touched by a user, and prevent the touch sensing layer from direct contact with other electrical components disposed inside a touch display apparatus, such as printed circuit board. However, while the surface of the touch sensing layer faced outward is protected by the protecting layer, measurements conducted to acquire electrical properties of the touch sensing layer may also be blocked by the protecting layer. Therefore, measurements conducted to acquire electrical properties of the touch sensing layer needs to connect with a touch sensing layer through an external circuit after the protecting layer is assembled. That is to say, the electrical properties acquired from the aforesaid measurement are substantially generated by a measured touch sensing layer and an electrically-coupled external circuit.

Although, electrical properties of a touch sensing layer can be mathematically separated from combined electrical properties of the touch sensing layer and an electrically-coupled external circuit in the manner that measuring various electrical properties under various inputs, and executing numerous computations. However, the more the touch sensing modules are fabricated, the more computing time would be required, especially for dealing with complex computations. Consequently, the inspection time and the fabricated cost of touch sensing modules would also be increased. Yet, in order to decrease the inspection time and the complexity of quality control, and further increase the precision of the electrical properties measured from the touch sensing layer, the available structure of a touch sensing module, as described above, apparently exists with inconvenience and defect, which needs further improvement. To deal with aforesaid problem, practitioners of ordinary skill in the art have striven to attain a solution which still lacks a suitable solution to be developed. Therefore, to deal with aforesaid problem effectively is an important subject of research and development, and also a desired improvement in the art.

SUMMARY

The present disclosure provides a three-dimensional curvature display apparatus. The three-dimensional curvature display apparatus includes a curved protective layer, a shaping layer, a first adhesive layer, a liquid crystal display module and an interlayer. The first adhesive layer is disposed between the curved protective layer and the shaping layer. The first adhesive layer is configured to attach the curved protective layer and the shaping layer. The interlayer is bonded between the shaping layer and the liquid crystal display module.

The present disclosure provides a touch sensing module. The touch sensing module includes a substrate, first sensing electrodes and a first covering layer. The substrate has a first surface. The first sensing electrodes are disposed on the first surface. Each of the first sensing electrodes has a first end and a second end opposite to the first end. The second end is used to be electrically connected with an external circuit. The first covering layer is disposed on a side of the first sensing electrodes distal from the substrate, and covering the first sensing electrodes. The first covering layer has first openings. The first ends are exposed in the openings respectively.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
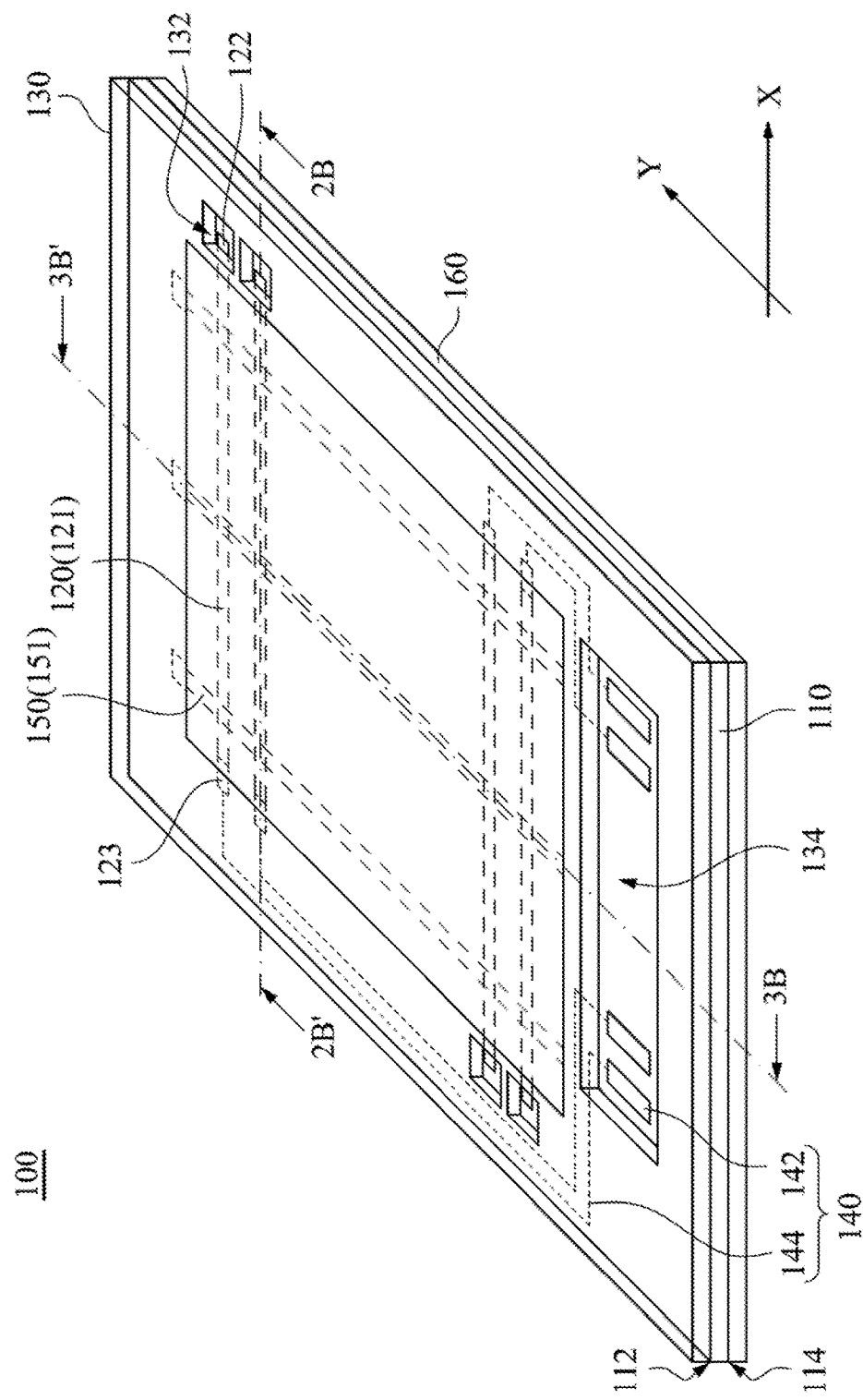
FIG. 1 illustrates a three-dimensional schematic graph of a touch sensing module according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Figure 2A:
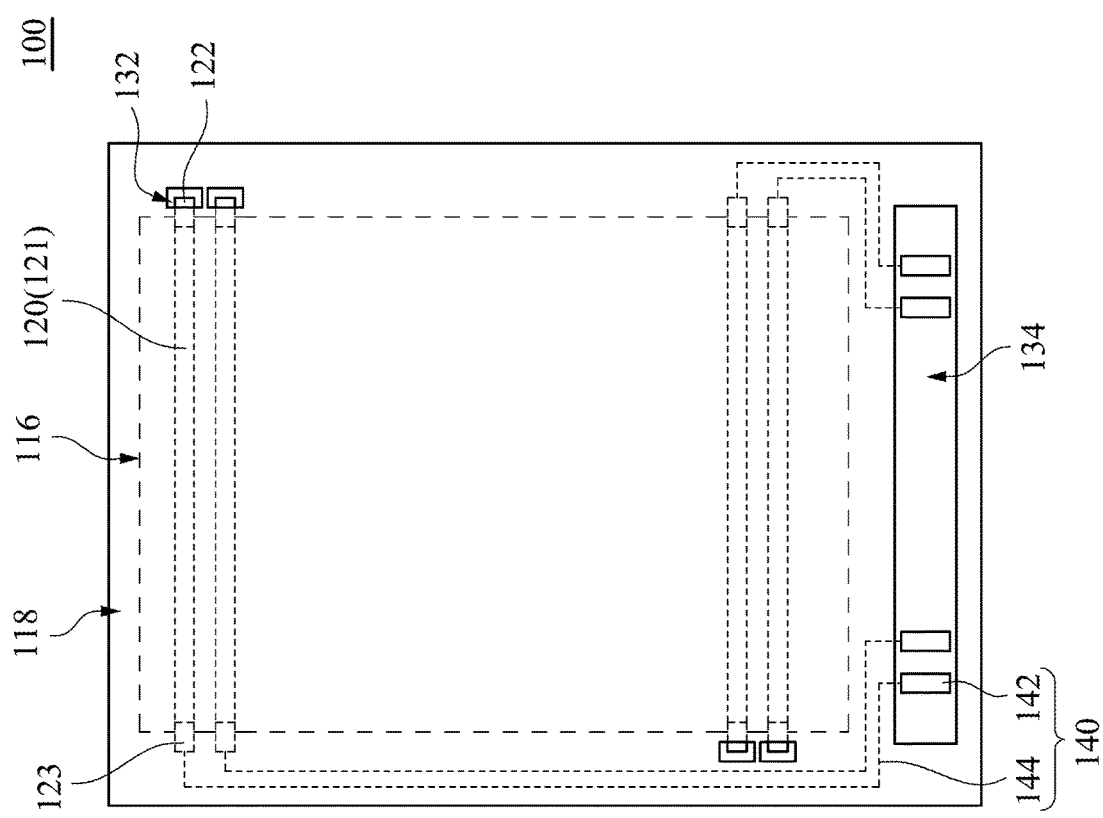
FIG. 2A illustrates a top perspective view from a side of a first surface of the touch sensing module illustrated in FIG. 1.
Figure 2B:
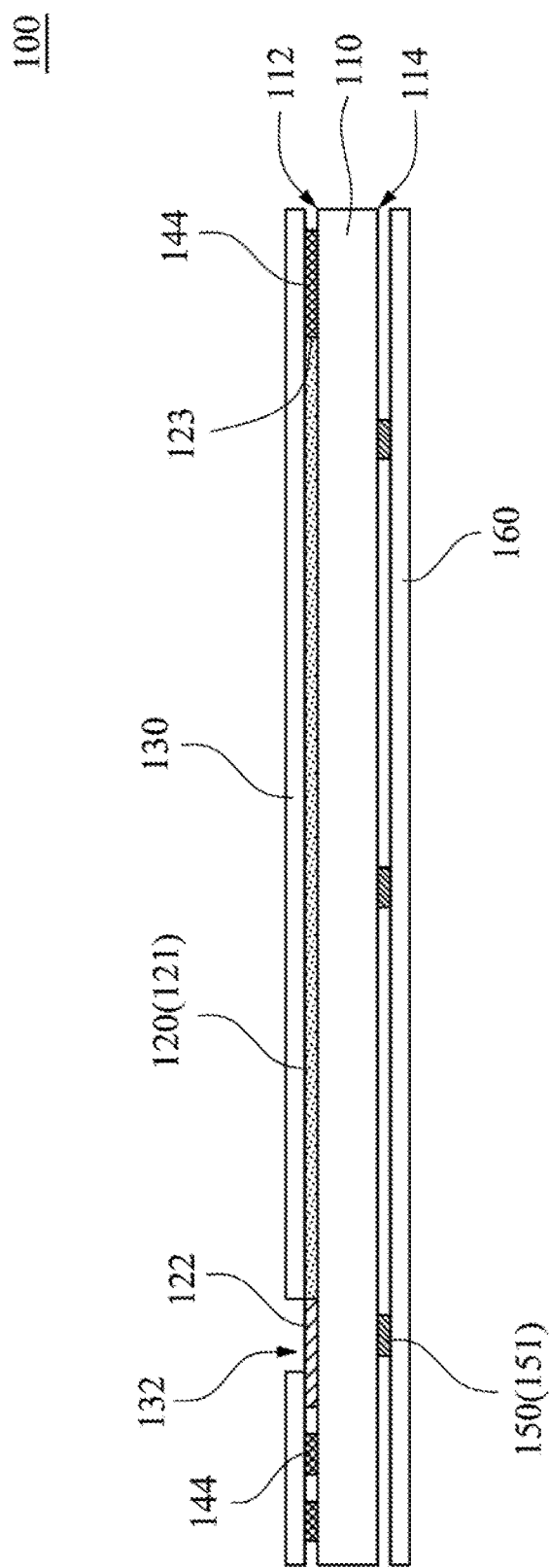
FIG. 2B illustrates a longitudinal sectional view of the touch sensing module illustrated in FIG. 1 along a segment 2B-2B'.

FIG. 1 is a three-dimensional schematic graph illustrated a touch sensing module 100 according to an embodiment of the present disclosure. FIG. 2A illustrates a top perspective view from a side of a first surface 112 of the touch sensing module 100 illustrated in FIG. 1. FIG. 2B illustrates a longitudinal sectional view of the touch sensing module 100 illustrated in FIG. 1 along a segment 2B-2B'. As shown in FIG. 1l, a touch sensing module 100 includes a substrate 110, first touch sensing layer 120 and a first covering layer 130. The substrate 110 has a first surface 112 and a second surface 114 opposite to the first surface 112. The first touch sensing layer 120 is disposed on the first surface 112, and includes first sensing electrodes 121.

As shown in FIG. 2A and FIG. 2B, each of the first sensing electrodes 121 has a first end 122 and a second end 123 opposite to the first end 122. The second end 123 can be electrically connected with a first external circuit 140. The first sensing electrodes 121 can further be electrically connected to other electronic components, such as flexible printed circuit (FPC) . . . etc., through the first external circuit 140.

Referring to the FIGS. 1, 2A, and 2B, the first covering layer 130 is disposed on a side of the first sensing electrodes 121 distal from the substrate 110, and covers the first sensing electrodes 121. The first covering layer 130 has first openings 132. The first ends 122 of the first sensing electrodes 121 are exposed within the first openings 132 respectively. An electrical testing equipment, such as a testing probe, can contact or be connected to the first sensing electrodes 121 through the first ends 122 exposed within the first openings 132. In some embodiments, an area size of the first openings 132 can be greater than 7 $\mu m^2$. In other embodiments, the area size of the first openings 132 can be 5 $\mu m^2$, 3 $\mu m^2$ or other suitable area size. It should be understood that, the area size of the first openings 132, described above, is only an example, and not intended to limit the present disclosure, it could be adjusted to actual demand by those skilled in the art. That is, the prerequisite of the area size of the first openings 132 is that a testing probe or other testing equipment can contact with or be connected to the first ends 122 via the first openings 132.

Owing to a testing circuit, such as testing probes . . . etc., which can be directly connected with the first ends 122 of the first sensing electrodes 121 via the first openings 132, a measurement or testing of electrical properties and electrical signals conducted on the first sensing electrodes 121 can be executed. Therefore, the present disclosure can avoid parasitic capacitance or parasitic inductance generated by the first external circuit 140 being coupled with the first sensing electrodes 121 in the manner that directly connecting with the first sensing electrodes 121 through the first ends 122 instead of routing through the first external circuit 140 and the second ends of the first sensing electrodes 121, and the measuring result can be more accurate. In other words, while the first ends 122 are exposed through the first openings 132 formed on the first covering layer 130, a testing circuit can acquire the electrical properties of the first sensing electrodes 121 more accurately. Furthermore, the present disclosure may save computing time and acquire electrical properties more precisely while the electrical properties are directly acquired from the first sensing electrodes 121. That is, the quality control of the touch sensing module 100 can be more precise and convenient.

Referring to the FIG. 2A and FIG. 2B, in the present embodiments, the first external circuit 140 includes first external-connecting electrodes 142 and conducting routes 144. The first external-connecting electrodes 142 are connected to the second ends 123 through the conducting routes 144 respectively. In some embodiments, the first covering layer 130 may further have at least one second opening 134. The first external-connecting electrodes 142 can be exposed within the second opening 134 for other electrical components electrically connected to the first external-connecting electrodes 142 via the second opening 134.

In some embodiments, the substrate 110 has a visible region 116 (the area enclosed within the dotted line in FIG. 2A) and a peripheral region 118 adjoined the visible region 116 (the area outside the dotted line in FIG. 2A). The vertical projection of each of the first openings 132 projected on the substrate 110 is located in the peripheral region 118. In other embodiments, the touch sensing module 100 may further include a light-shielding layer (which is not illustrated). The light-shielding layer is disposed on the peripheral region 118 of the substrate 110, such that the conducting routes 144 and the first openings 132 . . . etc., can be hidden by the light-shielding layer. Consequently, the light-shielding layer can avoid the conducting routes 144 and the first openings 132 . . . etc. influenced the visible performance of the touch sensing module 100.

In some embodiments, the material of the substrate 110 can be glass, polymethylmethacrylate (PMMA), polycarbonate (PC), polyimide (PI), sapphire, silicon-based, or other suitable transparent material. In some embodiments, the first sensing electrodes 121 can be formed by a transparent conductive material, for example, nanometer metal wires, metal meshes, transparent metal-oxide film, such as indium zinc oxide (IZO), aluminum doped zinc oxide (AZO), aluminum indium oxide (AIO), indium oxide (InO) or gallium oxide (GaO).

Figure 3A:
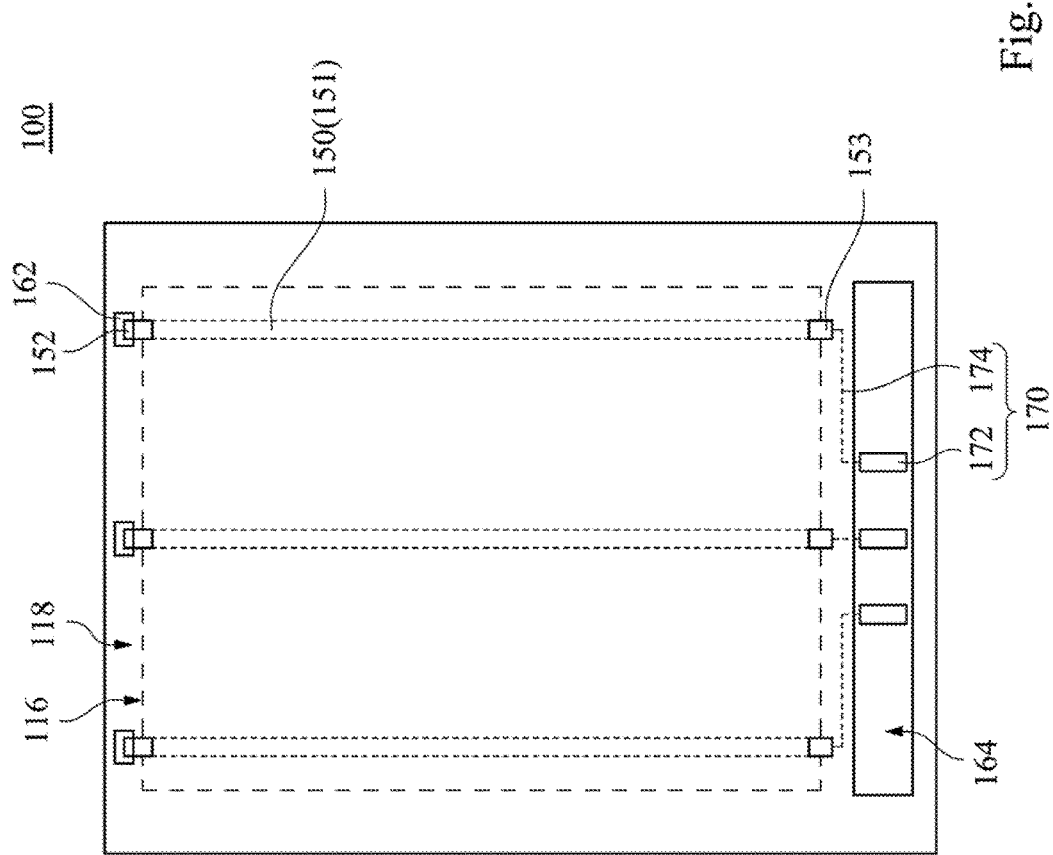
FIG. 3A illustrates a bottom perspective view from a side of a second surface of the touch sensing module illustrated in FIG. 1.
Figure 3B:
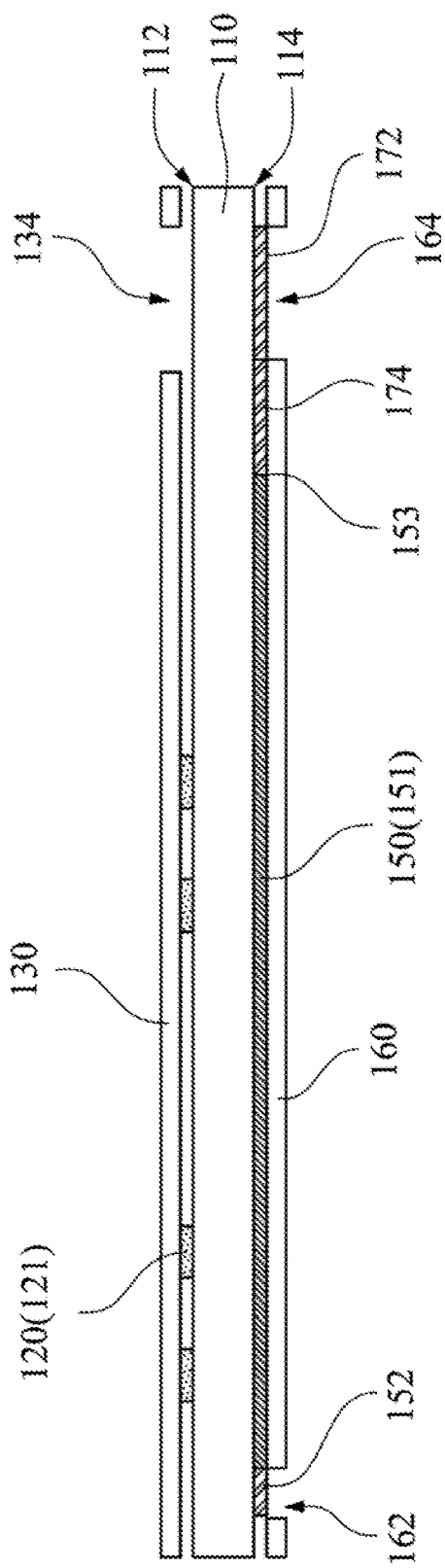
FIG. 3B illustrates a longitudinal sectional view of the touch sensing module illustrated in FIG. 1 along a segment 3B-3B'.

FIG. 3A illustrates a bottom perspective view from a side of a second surface 114 of the touch sensing module 100 illustrated in FIG. 1. FIG. 3B illustrates a longitudinal sectional view of the touch sensing module 100 illustrated in FIG. 1 along a segment 3B-3B'. As shown in FIG. 3A and FIG. 3B, in some embodiments, the touch sensing module 100 may further include a second touch-sensing layer 150 and a second covering layer 160. The second touch-sensing layer 150 is disposed on the second surface 114. The second touch-sensing layer 150 includes second sensing electrodes 151. Each of the second sensing electrodes 151 has a third end 152 and a fourth end 153 opposite to the third end 152. The fourth end 152 can be electrically connected with the second external circuit 170. The second sensing electrodes 151 can further be electrically connected to other electronic components, such as flexible printed circuit (FPC) . . . etc., through the second external circuit 170.

Referring to the FIGS. 1, 3A, and 3B, the second covering layer 160 is disposed on a side of the second sensing electrodes 151 distal from the substrate 110, and covers the second sensing electrodes 151. The second covering layer 160 has third openings 162. The third ends 152 of the second sensing electrodes 151 are exposed within the third openings 162 respectively. Testing equipment, such as a testing probe or other suitable testing equipment, can contact or be connected to the second sensing electrodes 151 through the third ends 152 exposed within the third openings 162.

In some embodiments, the second sensing electrodes 151 can be formed by a transparent conductive material, for example, nanometer metal wires, metal meshes, transparent metal-oxide film, such as indium zinc oxide (IZO), aluminum doped zinc oxide (AZO), aluminum indium oxide (AIO), indium oxide (InO) or gallium oxide (GaO).

Referring to the FIG. 3A and FIG. 3B, in some embodiments, the second external circuit 170 includes second external-connecting electrodes 172 and conducting routes 174. The second external-connecting electrodes 172 and conducting routes 174 are disposed on the second surface. The second external-connecting electrodes 172 are connected to the fourth ends 153 through the conducting routes 174 respectively. In some embodiments, the second covering layer 160 may further have at least one fourth opening 164. The second external-connecting electrodes 172 can be exposed within the fourth opening 164 for other electrical components electrically connected to the second external-connecting electrodes 172 via the fourth opening 164.

It should be noted that, the first sensing electrodes 121, the first external circuit 140, the first external-connecting electrodes 142, the conducting routes 144, the second sensing electrodes 151, the second external circuit 170, the second external-connecting electrodes 172, the conducting routes 174, the second opening 134 and the fourth opening 164, as described herein, is only an exemplary, and not intended to limit the present disclosure. For example, the first touch sensing layer 120 and the second touch sensing layer 150 may include more first sensing electrodes 121 and second sensing electrodes 151. For example, the second external circuit 170 may extend across the second surface 114 and the first surface 112, and the second external-connecting electrodes 172 can be disposed on the first surface 112 and exposed within the second opening 134. Therefore, the fourth opening 164 can be removed. For example, the first external circuit 140 may extend across the first surface 112 and the second surface 114, and the first external-connecting electrodes 142 can be disposed on the second surface 114 and exposed within the fourth opening 164. Therefore, the second opening 134 can be removed. For example, a flexible printed circuit can extend between the substrate 110 and the first covering layer 130, and be connected with the first external-connecting electrodes 142. For example, a flexible printed circuit can also extend between the substrate 110 and the second covering layer 160, and be connected with the second external-connecting electrodes 172. It should be understood that the present disclosure could be adjusted to actual demand by those skilled in the art, with a prerequisite that the first external circuit 140 is non-overlapped with the second external circuit 170, and both the first external circuit 140 and the second external circuit 170 can be connected to the other exterior electrical components.

Reference is made to FIG. 1. As shown in FIG. 1, in some embodiments, the first sensing electrodes 121 can be disposed parallel to each other along a first direction X. The second sensing electrodes 151 are disposed parallel to each other along a second direction Y differed from the first direction. The vertical projection of the second sensing electrodes 151 projected on the first surface 112 are individually intersected with the first sensing electrodes 121, so that the touch sensing module 100 can detect and locate the position touched by a user through electrical signal variations of the first sensing electrodes 121 and the second sensing electrodes 151. In the present embodiments, the second direction Y can be orthogonal to the first direction X. In other embodiments, the inter-angle between the first direction X and the second direction Y can be non-vertical.

Referring to FIG. 1, in some embodiments, vertical projection of at least one of the first ends 122 projected on the first surface 112 is located between the connecting routes 144 and the first sensing electrodes 121, so as to avoid the first ends 122 overlap or contact with the connecting routes 144.

Figure 4:
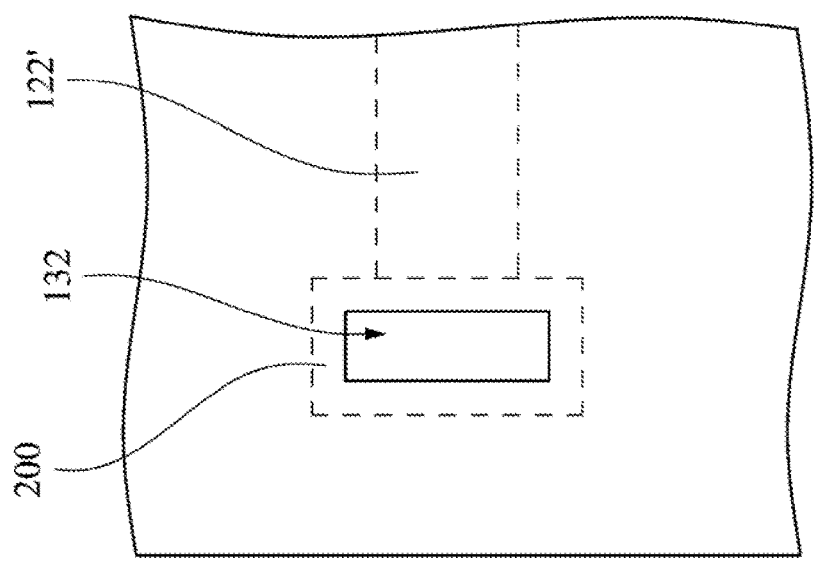
FIG. 4 illustrates a simplified schematic graph of a testing pad according to another embodiment of the present disclosure.

FIG. 4 is a simplified schematic graph illustrated a testing pad 200 and a first end 122' according to another embodiment of the present disclosure, in which the testing pad 200 can be exposed within a first opening 132. As shown in FIG. 4, in some embodiments, the first sensing electrodes 121 may further include a testing pad 200 disposed on a first end 122' of the first sensing electrodes 121. The testing pad 200 may increase the size of contactable area for the connection between the testing equipment and the first end 122' comparing to the first end 122' only. In some embodiments, the material of the testing pad 200 may have higher hardness, for example, fabricated by a thick metal while the hardness is 3H or 4H . . . etc. Furthermore, the testing pad 200 may also prevent the first end 122' from testing marks generated by contact of the testing equipment, and further assist in maintaining the electrical properties of the first sensing electrodes 121. Consequently, the testing pad 200 may also maintain the stability of the electrical properties of the first sensing electrodes 121.

Summarized from the above, the present disclosure provides a touch sensing module. The touch sensing module includes a substrate, sensing electrodes and a covering layer. The sensing electrodes are disposed on a surface of the substrate. Each of the sensing electrodes has a first end and a second end opposite to the first end. The second end is used to be electrically connected with an external circuit. The covering layer is disposed on a side of the sensing electrodes distal from the substrate, and covering the sensing electrodes. The covering layer has openings. The first ends are exposed in the openings respectively. Owing to the first ends of the sensing electrodes, distal from the second ends, are exposed the openings formed on the covering layer, a testing equipment, such as testing probe, can be directly connected to the sensing electrodes via openings. Consequently, the present disclosure can reduce the side-effects influenced by the sensing electrodes generated by the external circuit while measuring the electrical properties of the sensing electrodes, the acquisition of the electrical properties of the sensing electrodes conducted by testing equipment can be more accurate. The quality control of the touch sensing module would be easier.

Although some embodiments of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. A touch sensing module, comprising:
   a substrate having a first surface;
   a plurality of first sensing electrodes disposed on the first surface, wherein each of the first sensing electrodes has a first end and a second end opposite to the first end, the second end is configured to be electrically connected with an external circuit;

a first covering layer covering the first sensing electrodes and having a plurality of first openings, wherein the first covering layer and the substrate are positioned on two opposite sides of the first sensing electrodes, and the first ends are exposed within the first openings respectively;

a plurality of test pads disposed directly on the first ends of the first sensing electrodes respectively, wherein at least a part of the test pads are exposed directly to open air within the first openings respectively;

a plurality of first external-connecting electrodes disposed directly on the first surface, wherein the first external-connecting electrodes are connected with the second ends of the first sensing electrodes respectively, the first covering layer further has at least one second opening, exposed the first external-connecting electrodes; and a plurality of connecting routes disposed on the first surface directly connecting the second ends of the first sensing electrodes to the first external-connecting electrodes respectively, wherein vertical projection of at least one of the first ends projected on the first surface is located between the connecting routes and the first sensing electrodes and is located in a peripheral region.

2. The touch sensing module of claim 1, wherein an area size of each of the first openings is greater than 7 $\mu m^2$.

3. The touch sensing module of claim 1, wherein the substrate has a visible region, the peripheral region adjoined the visible region, wherein a vertical projection of each of the first openings projected on the substrate is located in the peripheral region.

4. The touch sensing module of claim 1, wherein the substrate further has a second surface opposite the first surface, wherein the touch sensing module further comprises:

a plurality of second sensing electrodes disposed on the second surface, wherein each of the second sensing electrodes has a third end and a fourth end opposite to the third end, and the fourth end is configured to be electrically connected with the external circuit; and a second covering layer disposed on a side of the second sensing electrodes distal from the substrate, and covering the second sensing electrodes, wherein the second covering layer has a plurality of third openings exposed the third ends respectively.

5. The touch sensing module of claim 4, wherein the first sensing electrodes are disposed parallel to each other along a first direction, and the second sensing electrodes are disposed parallel to each other along a second direction differed from the first direction, wherein vertical projection of the second sensing electrodes projected on the first surface are individually intersected with the first sensing electrodes.

6. The touch sensing module of claim 5, wherein the second direction is orthogonal to the first direction.

7. The touch sensing module of claim 5, further comprising a plurality of second external-connecting electrodes disposed on the second surface, the second external-connecting electrodes are connected with the second ends of the first sensing electrodes respectively, wherein the second covering layer further has at least one fourth opening exposed the second external-connecting electrodes.

* * * * *